INVENTOR.
KUNIO NAKANO

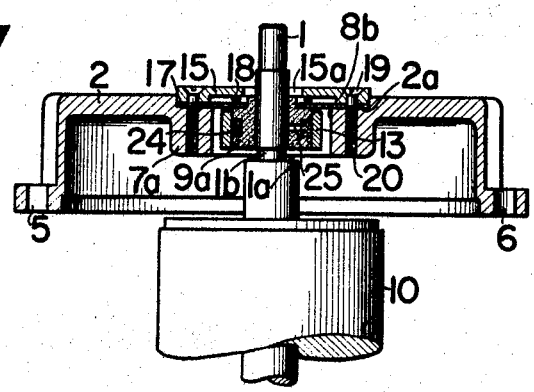
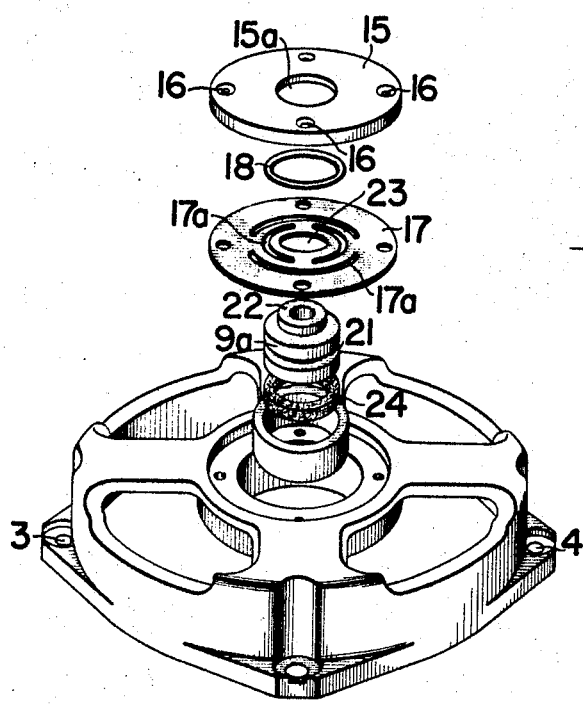

United States Patent Office 3,446,541
Patented May 27, 1969

3,446,541
SMALL ELECTRIC MOTOR
Kunio Nakano, % Akai Electric Co., Ltd., 14, 2-chome-12, Higashi-Kohjiya, Ohta-ku, Tokyo, Japan
Filed Oct. 28, 1965, Ser. No. 513,620
Claims priority, application Japan, Oct. 30, 1964, 39/61,450; Apr. 10, 1965, 40/20,967
Int. Cl. F16c 9/00, 13/02, 35/02
U.S. Cl. 308—22    5 Claims The invention relates broadly to small electric motors of constant speed type, especially adapted for driving the capstan shaft of a magnetic tape recorder, by way of example. More specifically this invention relates to improvements in and relating to bearing assemblies of small electric motors of the kind above referred to.

When these motors are operated in the cold winter or hot summer season, they are subjected to a considerable temperature difference from the standard design one, normally selected to be 20° C., thus the practical bearing gaps in the bearing assemblies are disadvantageously varied and the frictional characteristics are thereby altered to a considerable degree. This thermal effect will be encountered also in the case of continuous running of the motor for an extended period of time. When the motor is employed, for instance, to drive the captan shaft of a magnetic tape recorder and subjected to the thermal adverse effect above referred to, the possibility of a constant tape drive of the machine will be considerably reduced so that the tone quality will deteriorate. Similar disadvantages will also be encountered when these motors are fitted in or on other appliances, such as precision gauges, timepieces, control mechanisms and the like.

It is the main object of the present invention to provide a bearing assembly having a substantially constant frictional and bearing characteristic even when subjected to external and internal temperature fluctuations.

Another object of the invention is to provide a bearing assembly of the above kind which is well-lubricated.

Still another object of the invention is to provide a bearing assembly of the above kind, having in addition a self-centering performance with simple, yet reliable means.

Various further and more specific objects, features and advantages of the invention will appear from the description given below, taken in conjunction with the accompanying drawings illustrating two preferred embodiments of the invention.

In the drawings:

FIG. 3 is a similar view to FIG. 1, illustrating a second embodiment of the invention; and FIG. 4 is an exploded perspective view of the bearing assembly shown in FIG. 3.

Figure 1:
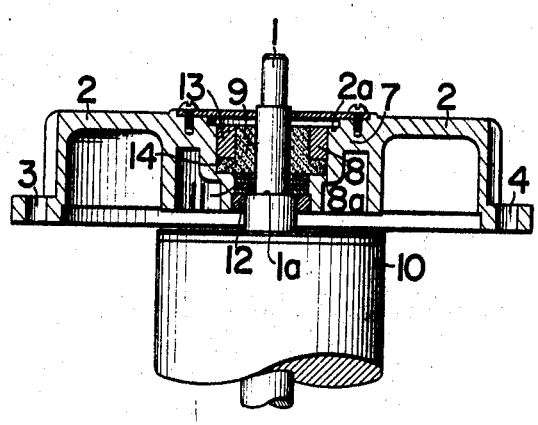
FIG. 1 is a longitudinal section of a bearing assembly equipped in a small capacity electric motor as a first embodiment of the invention.
Figure 2:
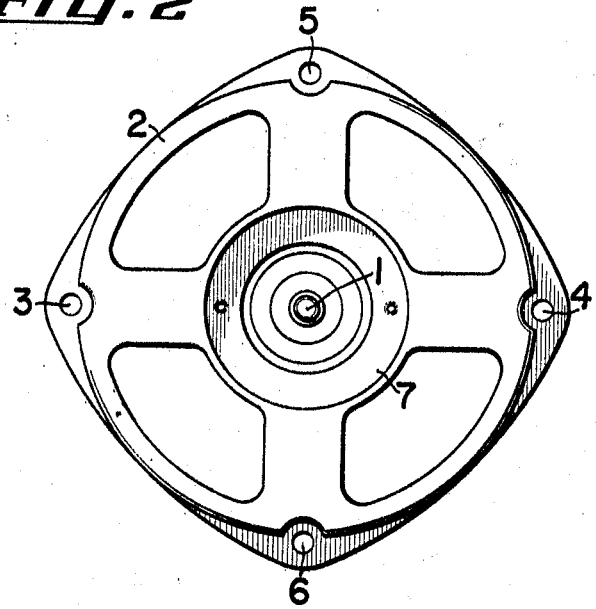
FIG. 2 is a top plan view thereof.

Referring to the accompanying drawings, especially FIGS. 1 and 2 thereof, a first embodiment of the invention will be described hereinbelow in detail:

These figures represent the upper end part of an electric motor, 1/60 H.P., two pole, 50 cycle, 100 volt, hysteresis type, to be operated at a standard speed of 3,000 r.p.m. Numeral 1 denotes a conventionally designed rotor shaft, a part thereof only being shown schematically. Rotor coils, stator coils and the main part of the motor are mounted in a conventional cylindrical housing and end covers, as shown at 2, are provided to be belted at 3, 4, 5, 6, to the housing. The conventional parts of motor and housing have been omitted from the drawing for clarity. The cover 2 is made of die cast aluminium and may be of substantially a cup shape as shown. This cover 2 is formed with conventional bolt holes 3–6 for the detachable connection with the motor housing. Further, the cover is formed with boss 7 having a stepped bore 8 passing therethrough through the latter, a porous and compacted oilless bearing metal element 9 having an enlarged inner end abutting against the shoulder 8a for rotatably guiding the shaft of the rotor which is denoted by 10. Such porous, compacted bearing metals are well known in the bearing art, and are known to be relatively soft their locked hardness being compensated for by provision of large surfaces to distribute the bearing pressures. A plurality of washers, generally shown as at 11, are placed between the lower end of the bearing metal and a shoulder 1a formed on the rotor shaft 1.

A resilient sealing ring 12 for instance, made of synthetic rubber is inserted under pressure between the inside bore surface of boss 7 and the largest portion of rotor shaft 1, being kept in contact with the innermost surface of the washer assembly for the prevention of possible invasion of foreign solid particles from the inside space of the housing into the bore of boss 7 towards the bearing surface of metal 9.

As a most important constructional feature of the aforementioned bearing assembly, there is provided a steel ring 13 press-fit between the inside wall surface of the enlarged outer portion of bore 8 and the outside reduced and cylindrical peripheral surface of the bearing metal element 9 concentrically with the shaft 1, said ring being finished ground to predetermined precise dimensions for allowing the said press-fit. For filling up the remaining idle space beneath the ring 13 within the enlarged bore part, there is provided an oil-absorbing ring 14 made from fibrous material, such as felt or the like, which is adapted for containing a quantity of lubricating oil.

If steel ring 13 were not provided in the bearing assembly, the aluminum cover 2 shrinking considerably when the ambient temperature falls substantially, for instance in a cold weather, which would result in a corresponding reduction in the size of bore 8 in the boss. Although the amount of this bore reduction is small, the resulting radial forces acting upon the outer peripheral surface of bearing metal element 9 are very strong and the frictional coefficient between the bearing metal and the rotor shaft will substantially increase, which will result in a considerable time delay for attaining the standard rotational speed of the motor, such as 3,000 r.p.m. by way of example, upon starting of the motor. As an extreme example, the motor can not start on account of the highly increased frictional coefficient. In a cold weather, as encountered in the severe winter, the time delay will generally amount to 6–7 minutes as a means for the above-mentioned kind of small motors.

With the provision of the steel ring 13, however, the aforementioned radial contraction in the metal of cover 2 can be effectively counteracted at this point and thus the frictional troubles as referred to above can be almost entirely obviated. It is natural that two sets of steel rings as at 13 are provided for each end of the electric motor, only one of them being illustrated in the drawing.

I have completed three sets of test motors for comparison tests, for the purpose of demonstrating the superior results of my invention. These motors are not equipped with the steel ring as a most predominant element of the motor according to this invention. In No. 1 motor, there were upper and lower bearings gaps of 4.5 and 6/1000 mm., respectively. Corresponding figures for No. 2 motor amounted to 3.0 and 3.5/1000 mm. For No. 3 motor, these figures were measured as 2.8 and 3.0/1000 mm., respectively.

When these test motors of the conventional design were introduced in an air-conditioned chamber, kept at a constant temperature of −5° C., and the starting time delay of the above kind was measured for each of the motors, the measured values amounted to 7 minutes, 15 seconds; 6 minutes, 54 seconds and 4 minutes, 2 seconds, for the motors No. 1–3, respectively. It will be clear to those skilled in the art that such considerable starting delay as referred to above would result in failure of acceptance tests.

If the bearing gaps were to be enlarged so as to avoid this drawback, bearing noises would become large so that the motors might be rejected.

When these motors are equipped with the aforementioned steel rings 13 however which may be made for instance of other harder material such as tungsten carbide or the like, if necessary, the starting time lag could be reduced to 15 seconds, 35 seconds, and 1 minute, 50 seconds, respectively. The last or No. 3 motor would still not be suitable for use in magnetic tape recorders on account of its considerable starting delay, but it could be well utilized for other purposes adopting rather moderate limits for starting conditions.

When the temperature was raised to 0° C., the corresponding figures as observed under otherwise same test conditions as the above test, the starting delay for attaining the above specified standard running speed was reduced to 2 seconds and 10 seconds, respectively, for No. 1 and No. 2 motors. The results were remarkable, thus representing a considerable progress in the art.

In order to determine the degree of contraction of the end cover, the outside diameter thereof was measured under several temperature conditions, since the bore alteration was difficult to determine under assembled condition. Now denoting the diameter measured in one diametral direction of the cover at 20° C. by A and that measured in the second direction perpendicular to the said one direction by B, and those corresponding diameters as measured at various different temperatures by $A'$ and $B'$, respectively, the following results were obtained, units being given in millimeters.

*Example 1*

For a cover wherein A=41.19 and B=41.21, a first test at −5° C. gave: $A'$=41.16 and $B'$=41.48. At a second test at −50° C., $A'$=41.15 and $B'$=41.18. At a third test at −70° C., $A'$=41.16 and $B'$=41.17.

*Example 2*

For a second cover wherein A=41.19 and B=41.18, a first at −5° C. gave: $A'$=41.16 and $B'$=41.16. At a second test, $A'$=41.18 and $B'$=41.16.

The diametral contraction, although of a minor value, of the light metal cover, gives rise to developing intense radial compressive stresses in the bearing metal, causing enough reduction in diameter to increase the frictional resistance between the bearing metal and the mating rotor shaft, as referred to above.

As an example, with a bore of 6.35–0.001 mm. at 20° C., it was reduced to 6.35–0.003 mm. at −5° C., which invited a considerable starting time lag as was described hereinbefore.

On the contrary, when the motor is operated, for instance, in the tropics, the bore may increase to an unacceptable degree. Such a drawback can be also remedied by the provision of the ring 13.

Next, referring to FIGS. 3 and 4, a second embodiment of the invention, wherein an automatic centering arrangement is further incorporated.

In this case, rotor 10, shaft 1 thereof, end cover 2 and bolt holes 3–6 are of substantially same design as before, so that further detailed description thereof may be omitted therefrom, without affecting better understanding of the invention. It is to be noted, however, the rotor shaft 1 in this case, is formed with a peripheral groove 1b in neighboring relation with the shoulder 1a on the shaft.

The boss as at 7a of the cover 2 is designed to have a rather simple configuration and formed with a straight bore 8b, the upper extremities thereof being transformed into an enlarged circular recess 2a which is also provided in the first embodiment, although not referred to.

A pressure disc 15 having a central opening 15a is detachably fixed through the intermediary of a thin resilient metallic disc 17 to the cover 2 at its central recess 2a by means of a plurality of set screws 19 passing through reception openings 16 and threaded into corresponding female threaded openings 20 formed through the boss 7a, said disc being formed with a plurality of concentric grooves or slots 17a for increasing the resiliency of the disc.

9a denotes a bearing metal, preferably of the porous and oil-absorbing nature which is known as the oilless type to those skilled in the art and formed with a peripheral groove 21 and a reduced cylindrical part 22. This metal 9a is fixed by its reduced part to the peripheral wall of central opening 23 of the resilient disc 17 by adhesion, fusing, press-fitting or any other conventional fixing measure and is formed with an axial bore passing therethrough, for slidingly receiving the shaft 1. Between the pressure disc 15 and resilient disc 17, there is inserted a resilient ring 18 made preferably of synthetic rubber or the like for absorbing thrust forces transmitted thereto from the rotor shaft through the intermediary of the bearing metal and resilient disc.

Oil-containing ring 24 is formed of a fibrous or porous and resilient material such as felt, textile fibers or the like and slid into the mating groove 21, for feeding continuously at a proper rate of lubricating oil to the bearing surface through a radial opening 25 provided for this purpose in the metal 9a. Steel or sintered hard metal ring 13 is press-fit on the outside peripheral surface of the bearing metal 9a just as in the preceding embodiment for the same compensating purpose.

This compensating performance is still further increased by the provision of resilient disc 17, because possible expansion or contraction of the end cover 2 caused by alteration or fluctuation of the ambient temperature. More specifically, any contraction in the cover will cause only a corresponding compression of the resilient disc to take place and thus it can not substantially be transmitted to the bearing metal. It will be clear from the foregoing that any thermal expansion of the cover induces only a corresponding and resilient enlargement of the disc 17.

The operation mode of either of the said both embodiments, not described so far, is just the same as that of the conventional arrangement, so that no further description thereof may be necessary to set forth, as the same will be easily and definitely conceivable from the foregoing detailed description by those skilled in the art.

It will be understood that modifications and variations of the invention disclosed herein may be resorted to without departing from the scope of the concepts of the present invention. Therefore, the scope of the invention should be limited only by the scope and proper interpretation of the claims appended hereto.

What I claim is:

1. A bearing assembly for a constant speed electric motor of the type including a rotor mounted on a shaft, a stator inclosed in a generally cylindrical housing, and at least one lightweight metal end cover adapted to be attached to the housing, an inwardly directed boss on said end cover, said boss having a bore concentric to said rotor shaft presenting a radially inward facing cylindrical surface and positioned for said rotor shaft to extend therethrough, an anti-friction bearing metal piece provided with a cylindrical surface concentric to but spaced from the inward facing cylindrical surface of said bore of said boss positioned within said bore to receive and support said rotor shaft for rotation, a steel tungsten carbide ring press fitted between the cylindrical surfaces of said bore of said boss and said bearing metal piece, whereby compression stresses caused by thermal shrinkage of said lightweight metal end cover at low temperatures are substantially resisted by said steel ring.

2. The bearing assembly of claim 1 in which said end cover is made of aluminum.

3. A bearing assembly for a constant speed electric motor of the type including a rotor mounted on a shaft, a stator inclosed in a generally cylindrical housing, and at least one lightweight metal end cover adapted to be attached to the housing, an inwardly boss on said end cover, said boss having a bore concentric to said rotor shaft presenting a radially inward facing cylindrical surface concentric to said rotor and positioned for said rotor shaft to extend therethrough, an anti-friction bearing metal piece provided with a cylindrical surface concentric to but spaced from the inward facing cylindrical surface of said bore of said boss positioned with said bore to receive and support said rotor shaft for rotation, a tungsten carbide ring press fitted between the cylindrical surfaces of said bore of said boss and said bearing metal piece, whereby compression stresses caused by thermal shrinkage of said lightweight metal end cover at low temperatures are substantially resisted by said tungsten carbide ring.

4. A bearing assembly for an electric motor of the type including a rotor mounted on a shaft, a stator enclosed in a generally cylindrical housing, and at least one lightweight metal end cover adapted to be attached to the housing, an inwardly directed boss on said end cover, said boss having a bore concentric to said rotor shaft presenting a radially inward facing cylindrical surface and positioned for said rotor shaft to extend therethrough, an anti-friction bearing metal piece provided with a cylindrical surface concentric to but spaced from the inward facing surface of said bore positioned within said bore to receive and support said rotor shaft for rotation, a ring of a material harder than said bearing piece press fitted onto the cylindrical surface of said bearing piece, said bearing piece having a portion of reduced cross-section in proximity to said end cover, a disc of resilient material having four arcuate slots arranged in two circles and two slots in each circle, with each slot extending through an arc of slightly less than 180°, said disc having an aperture for receiving the portion of reduced cross-section of said bearing piece, and means fixing the disc to said boss.

5. The motor of claim 4 in which the material of said ring is tungsten carbide.

References Cited
UNITED STATES PATENTS

| | | | |
|---|---|---|---|
| 3,170,736 | 2/1965 | Wright | 308—26 |
| 3,235,316 | 2/1966 | Whanger | 308—237 X |
| 2,823,084 | 2/1958 | Hansen | 308—22 |
| 3,084,003 | 4/1963 | Matt et al. | 308—22 |

MARTIN P. SCHWADRON, *Primary Examiner.*

F. SUSKO, *Assistant Examiner.*

U.S. Cl. X.R.

308—237